Nov. 14, 1933.  B. N. WALLIS  1,935,491
GUN MOUNTING FOR AIRCRAFT
Filed April 4, 1933  3 Sheets-Sheet 1

Nov. 14, 1933.   B. N. WALLIS   1,935,491
GUN MOUNTING FOR AIRCRAFT
Filed April 4, 1933   3 Sheets-Sheet 2

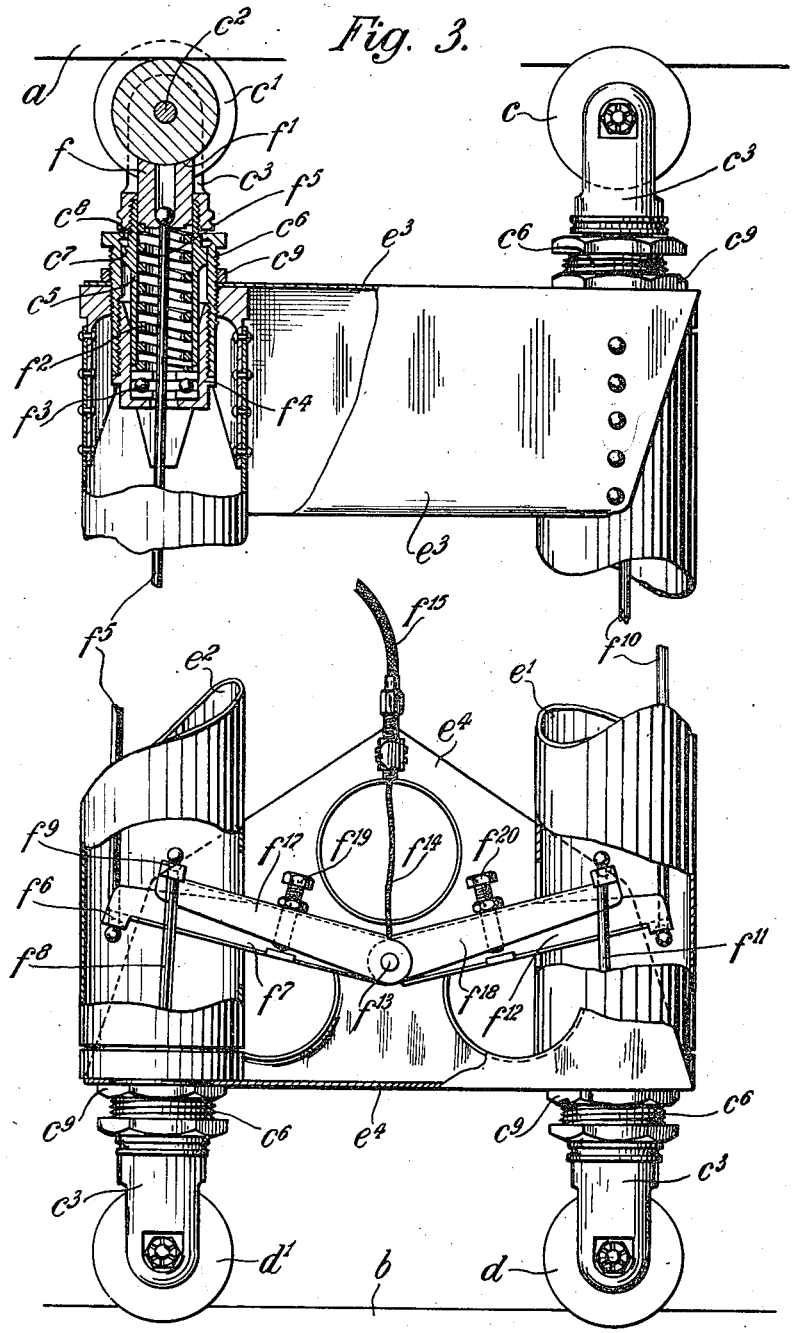

Patented Nov. 14, 1933

1,935,491

UNITED STATES PATENT OFFICE 1,935,491

GUN MOUNTING FOR AIRCRAFT

Barnes Neville Wallis, Weybridge, England, assignor to Vickers-Armstrongs Limited, Westminster, England Application April 4, 1933, Serial No. 664,450, and in Great Britain October 15, 1932

9 Claims. (Cl. 89—40)

This invention relates to aircraft gun mountings and refers more particularly to gun mountings comprising a track around which run rollers on the upper end of a mounting member that depends downwardly from the track, said mounting member having pivoted on its upper end an arm carrying the gun and also carrying below said arm a seat for the gunner. Hitherto, in such gun mountings the mounting member inclined downwardly to a single pivot at its lower end located centrally with respect to the track, and thus, when released, its upper end tended to run to one of the points on the track situated at the greatest distance from said pivot.

The object of the present invention is to provide a mounting member which will not tend to run to any particular points on the track.

Another object is to provide a mounting member which will not obstruct the lower part of the cockpit.

Further objects are to provide a gun mounting of improved rigidity and simple construction applicable to non-circular as well as circular tracks, overcoming the difficulties which arise from changes in curvature of parts of the tracks that the rollers contact with at different positions of the mounting member and which arise from the necessity of rigidly supporting the mounting member in all positions in order to eliminate, as far as possible, vibration of the mounting member when firing the gun.

According to this invention, the aircraft gun mounting comprises, upper and lower similar tracks of continuous form arranged about a common axis, upper and lower pairs of rollers mounted to run around said tracks and a standard carried by said rollers and movable therewith around said tracks.

With this construction the upper and lower ends of the standard run around the parallel tracks and thus the standard will always be at the same angular relationship to said common axis at any position of azimuth adjustment so that it will not tend to run to any particular points on the track and will not obstruct the cockpit. Moreover, with non-circular tracks all difficulties due to change in curvature of the tracks are avoided by mounting the rollers to turn like bogeys, which permit the rollers running around said tracks to accommodate themselves to any change in curvature without changing the angular relationship of the standard with respect to the tracks, by reason of which, with parallel tracks, the standard does not tend to run to any particular parts of the track. The term "tracks of continuous form" includes circular tracks, non-circular continuous curved tracks and a combination of straights and curves.

Brakes are provided for holding the standard to the tracks in any position of angular adjustment, and means is provided for permitting the withdrawal of said brakes when it is desired to adjust the standard in azimuth. These brakes will be self-applied so that they will only be withdrawn as long as the gunner continues to hold the means for permitting their withdrawal.

The standard carries between the upper and lower pairs of rollers a seat for the gunner. This seat is preferably mounted on parallel linkage mechanism so as to be adjustable to enable the gunner to accommodate the seat to suit the position of the gun when firing at different elevations. With such seats it is desirable to arrange that the seat is not only adjustable to suit the position of the gun, but also that the seat is adjustable to suit the size of the gunner. This is conveniently effected with a gun mounting construction according to this invention, which permits of mounting the seat on the standard by means of a bracket, which is adjustable so that the height of the seat as a whole can be adjusted to suit the size of the gunner. This bracket is provided with upper and lower arms pivoted for angular adjustment and inter-connected at their outer ends by a link, forming the parallel linkage mechanism carrying the seat, described in my United States application Serial No. 661,162, filed March 16th, 1933.

The invention will now be described with reference to the form of construction shown in the accompanying drawings, in which:—

Fig. 3 is a side elevation of the standard and rollers carrying the standard, partly in section, on the line 3—3 in Fig. 1 and drawn to an enlarged scale.

In the construction illustrated, the upper track $a$ and the lower track $b$ are of the same elliptical shape and are mounted about a common axis, represented by the chain dotted line $x$—$x$.

An upper set of flanged rollers $c$, $c^1$ are mounted to run on the under side of the upper track $a$ and a lower set of rollers $d$, $d^1$ are mounted to run on the upper side of the lower track $b$. By these rollers there is carried a standard $e$ which is movable with the rollers around said tracks.

The standard is composed of two tubular uprights $e^1$, $e^2$ spaced apart and inter-connected at their upper and lower ends by gusset plates $e^3$ and $e^4$ respectively. Each tubular upright carries at its upper end a roller $c$ or $c^1$ and at its lower end a roller $d$ or $d^1$.

Each of the four rollers is mounted in its tubular upright in exactly the same way, so that it is necessary merely to describe the method of mounting one of the rollers $c^1$, which roller and its mounting means are shown in section in Fig. 3. The axle $c^2$ of this roller is fixed in bifurcations on one end of a journal member $c^3$, the lower end of which is screwed on to the upper end of a hollow cylindrical sliding member $c^5$ so mounted in an outer carrier member $c^6$ as to slide axially and also be free to turn about its axis. Inside the journal member $c^3$ and sliding member $c^5$ there is slidably mounted a brake block $f$ shaped at $f^1$ to engage with the roller against which it is forced by means of the spring $f^2$ mounted between the brake block and a thrust race $f^3$. The spring $f^2$ not only acts to apply the brake block but also acts to move the roller $c^1$ upwards and hold it in close frictional engagement with the upper track $a$, the necessary upward movement of the roller being permitted by the sliding member $c^5$, which movement is limited by the co-acting shoulders $c^7$, $c^8$ on the sliding member $c^5$ and carrier member $c^6$ respectively.

Since the roller is spring pressed outwardly and the roller is also flanged, it is necessary, when assembling the standard between the tracks, to be able to retract the roller, which is effected by providing the separate carrier member $c^6$ which screws into the end of the tubular upright $e^1$, so that by screwing this down the roller can be retracted and after the standard has been moved into the required position, by screwing out the carrier member, the spring $f^2$ is allowed to expand the roller into close frictional engagement with the track. A lock-nut $c^9$ fixes the carrier member in its adjusted position.

All of the rollers will be similarly spring pressed against the tracks on which they run, which ensures close frictional engagement between the rollers and tracks. The thrust race $f^3$ is carried by an adjustment device $f^4$ which screws into the carrier member and thereby enables the compression of the spring to be adjusted.

Figure 1:
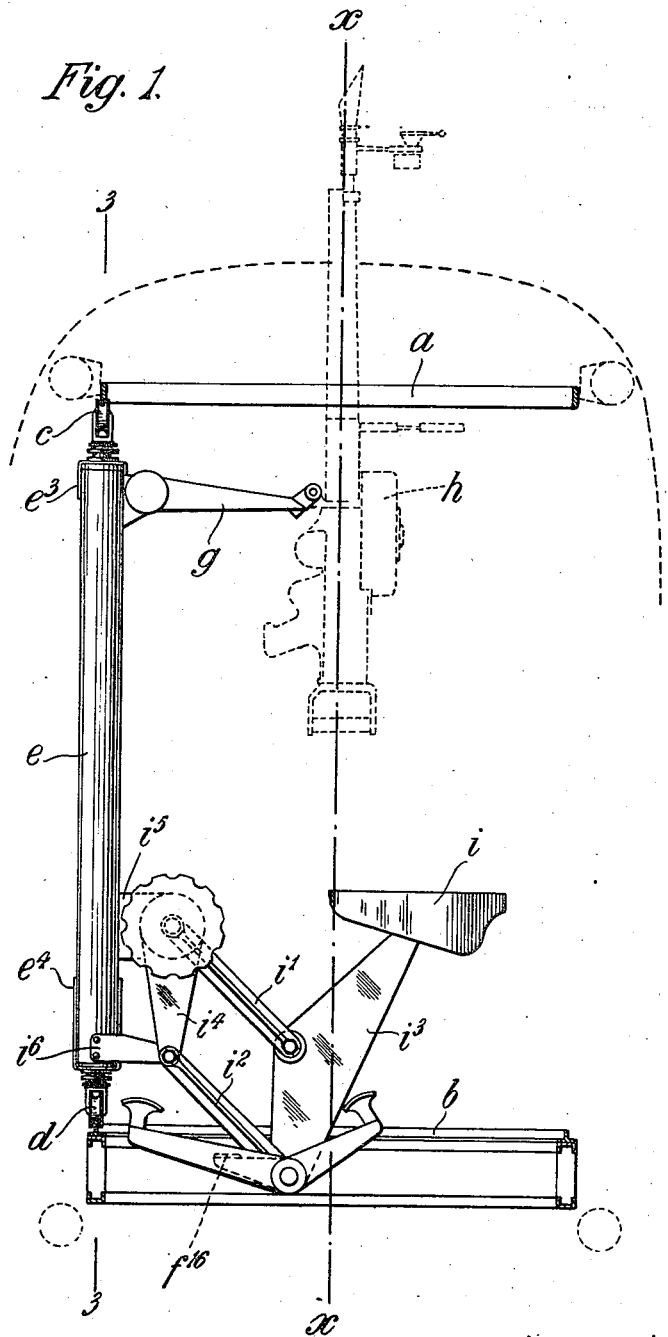
Fig. 1 is an elevation showing the upper and lower tracks mounted within a fuselage indicated by dotted lines and showing the rollers mounted to run on said tracks and the standard carried by the rollers and bearing the gun supporting link and adjustable seat.
Figure 2:
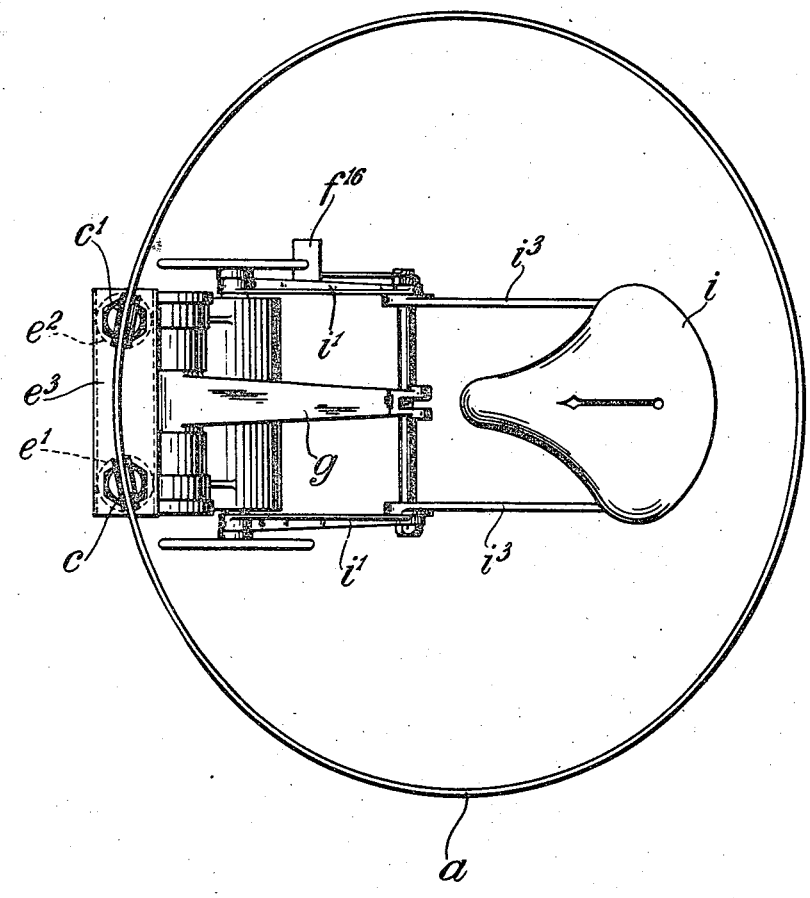
Fig. 2 is a plan view of the gun mounting drawn to an enlarged scale.

Fixed in the brake block $f$ is a brake rod $f^5$ which extends downwardly through the upright $e^2$ and connects at a point $f^6$ to a lever $f^7$. Further, similar braking devices and connecting means are provided for the rollers $c$ and $d$, the brake rods $f^{10}$ and $f^{11}$ of which are similarly connected to the lever $f^{12}$. The levers $f^7$ and $f^{12}$ extend towards each other and are connected at their inner ends by a common pivot $f^{13}$ to which is attached the inner member $f^{14}$ of a Bowden wire mechanism, the outer member $f^{15}$ of which mechanism is fixed in the known way to the gusset plate $e^4$. This Bowden wire mechanism is connected to and is operable by a brake pedal $f^{16}$ (Figs. 1 and 2). The lever $f^7$ in retracting the brake block $f$ rocks about the point $f^9$ at which it is connected to the brake block of the roller $d^1$ as a fulcrum and in withdrawing the brake block of the roller $d^1$, the lever $f^7$ rocks about the point $f^6$ as a fulcrum. A similar action takes place with regard to the lever $f^{12}$. In order to permit of adjustment the levers are provided with separate $f^{17}$, $f^{18}$ for connection to the rods $f^8$ and $f^{11}$ respectively, which parts are adjustable in relation to the lever by means of the screw adjustment devices $f^{19}$ and $f^{20}$.

The standard is provided at its upper end with an arm $g$ for carrying the gun indicated at $h$. The adjustable seat $i$ mounted on the parallel linkage mechanism $i^1$, $i^2$, $i^3$ has its links $i^1$, $i^2$ pivotally mounted on a support $i^4$ which is fixed to the standard by upper and lower brackets $i^5$ and $i^6$ respectively. The support $i^4$ may be adjustable in relation to the standard so that the height of the seat as a whole can be adjusted, in which case means will be provided for fixing the brackets $i^5$ and $i^6$ to the standard in any one of a number of different positions.

What I claim as my invention and desire to secure by Letters Patent is:—

1. An aircraft gun mounting comprising, upper and lower similar tracks of continuous form and having a common axis, upper and lower pairs of rollers mounted to run around said tracks, a brake block shaped to engage each of said rollers, means for slidably mounting said brake block, a spring in said mounting means for pressing said brake block into engagement with the roller, means for permitting retraction of said brake block against the action of said spring, and a standard carried by said rollers and adjustable therewith around said tracks, whereby the angular relationship of the standard to said common axis is the same at all positions.

2. An aircraft gun mounting comprising, upper and lower similar tracks of continuous non-circular shape and having a common axis, upper and lower pairs of rollers mounted to run around said tracks, journals for said rollers, mounting means for said journals adapted to permit said journals and rollers to accommodate themselves to changes in curvature at different parts of said tracks, a brake block in each of said journals having its one end shaped to engage the roller, a spring for pressing said brake block against the roller, means for permitting retraction of said brake block against the action of the spring, and a standard carried by said mounting means and adjustable around the tracks, said standard having the same angular relationship to said common axis at any of its adjusted positions.

3. An aircraft gun mounting comprising, upper and lower similar tracks of continuous form and having a common axis, upper and lower pairs of rollers, journals for said rollers, mounting means for said journals adapted to permit said rollers to move towards and away from said tracks, brake blocks in said mounting means adapted to engage said rollers, springs pressing said brake blocks against the rollers and also pressing said rollers against the tracks, means for retracting said brake blocks against the action of said springs, and a standard carried by said mounting means and adjustable around the tracks, said standard having the same angular relationship to said common axis at any of its adjusted positions.

4. An aircraft gun mounting comprising, upper and lower similar tracks of continuous non-circular shape and having a common axis, upper and lower pairs of rollers, journals for said rollers, mounting means for said journals adapted to permit said rollers to turn in order to accommodate themselves to changes in curvature at different parts of said tracks and to move towards and away from said tracks, brake blocks in said mounting means adapted to engage said rollers, springs pressing said brake blocks against the rollers and also pressing said rollers against the tracks, means for retracting said brake blocks against the action of said springs and a standard carried by said mounting means and adjustable therewith around the tracks, said standard having the same angular relationship to said common axis at any of its adjusted positions.

5. An aircraft gun mounting comprising, upper and lower similar tracks of continuous form and having a common axis, a standard extending between said tracks, pairs of flanged rollers at the upper and lower ends of said standard adapted to run on said tracks, journals for said rollers, hollow cylindrical slides carrying said journals, brake blocks in said slides engaging said rollers, springs pressing the brake blocks against the rollers and also pressing said rollers against said tracks, means for retracting said brake blocks against the action of said springs and outer carrier members receiving said hollow cylindrical slides and limiting their axial sliding movement, said outer carrier members being adjustable in the standard, whereby the rollers can be retracted to enable these to be fitted on to and removed from the tracks.

6. An aircraft gun mounting comprising upper and lower similar tracks of continuous elliptical shape and having a common axis, upper and lower pairs of flanged rollers, journals for said rollers, hollow cylindrical slides carrying said journals, outer carrier members for said slides adapted to permit said slides, journals and rollers to turn in order that the rollers may accommodate themselves to changes in curvature of the tracks at different positions and to move towards and away from said tracks, brake blocks in said hollow cylindrical slides adapted to engage said rollers, springs pressing said brake blocks against the rollers and also pressing said rollers against the tracks, means for retracting said brake blocks against the action of said springs, and a standard carried by said outer carrier members and adjustable therewith around the tracks, said outer carrier members being adjustably mounted in said standard so that the rollers can be retracted to enable them to be fitted in between the tracks and thereafter allowed to expand under the action of said springs into close frictional engagement with said tracks.

7. An aircraft gun mounting comprising, upper and lower similar tracks of continuous form and having a common axis, upper and lower pairs of rollers, journals for said rollers, mounting means for said journals, brake blocks in said mounting means adapted to engage said rollers, springs pressing said brake blocks against the rollers, a lever connected at two spaced points to the brake blocks of an upper and lower roller in each pair, brake release mechanism connected to a third point on said lever, said lever operating one brake block by rocking about its point of connection to the other brake block as a fulcrum, and a standard carried by said mounting means and adjustable therewith around the tracks, said standard having the same angular relationship to said common axis at any of its adjusted positions.

8. An aircraft gun mounting comprising, upper and lower similar tracks of continuous form and having a common axis; upper and lower pairs of rollers; journals for said rollers; mounting means for said journals; brake blocks in said mounting means adapted to engage said rollers; two levers, one connected at two spaced points to the brake blocks of an upper and a lower roller, and the other connected at two spaced points to the brake blocks of the remaining upper and lower rollers, said levers being inter-connected with each other at a third spaced point; brake release mechanism connected at said third spaced point to said levers; and a standard carried by said mounting means and adjustable therewith around the tracks, said standard having the same angular relationship to said common axis at any of its adjusted positions.

9. An aircraft gun mounting comprising, upper and lower similar tracks of elliptical shape and having a common axis; upper and lower pairs of flanged rollers; journals for said rollers; cylindrical slides carrying said journals and extending radially of said rollers; adjustable mounting means for said slides adapted to permit them to slide axially as well as turn about their axes; brake blocks in said mounting means adapted to engage said rollers; springs pressing said brake blocks against the rollers and also pressing said rollers against said tracks; means carried by said mounting means for adjusting the tension of said springs; two levers, one connected at two spaced points to the brake blocks of an upper and a lower roller and the other connected at two spaced points to the brake blocks of the remaining upper and lower rollers, said levers being interconnected with each other at a third spaced point; brake release mechanism connected to said third spaced point on said lever; two uprights carried by said mounting means and adjustable therewith around the tracks; and means for interconnecting the upper and lower ends of said uprights, said uprights having the same angular relationship to said common axis at any of their adjusted positions.

BARNES NEVILLE WALLIS.